United States Patent [19]

Brooks et al.

[11] Patent Number: 5,797,574
[45] Date of Patent: Aug. 25, 1998

[54] DRIVE NUT APPARATUS FOR VEHICLE SEAT ADJUSTER

[75] Inventors: Stephen R. Brooks, Farmington Hills; Dean L. Ruger, Manitou Beach, both of Mich.

[73] Assignee: Lear Corporation, Southfield, Mich.

[21] Appl. No.: 771,971

[22] Filed: Dec. 23, 1996

[51] Int. Cl.⁶ ..................................................... A47C 1/00
[52] U.S. Cl. ..................... 248/398; 74/89.15; 248/419; 248/421; 297/344.13; 297/344.15
[58] Field of Search .......................... 248/394, 398, 248/419, 421, 157; 74/89.15; 297/344.12, 344.13, 344.15

[56] References Cited

U.S. PATENT DOCUMENTS

| | | |
|---|---|---|
| 2,834,216 | 5/1958 | Thompson ..................... 74/89.15 X |
| 2,837,931 | 4/1958 | Brundage . |
| 3,194,531 | 7/1965 | Langer ............................. 248/421 |
| 4,015,812 | 4/1977 | Heesch . |
| 4,250,762 | 2/1981 | Weatherby ......................... 74/89.15 |
| 4,274,293 | 6/1981 | Ruger . |
| 4,432,583 | 2/1984 | Russo et al. . |
| 4,448,381 | 5/1984 | Anspaugh et al. . |
| 4,520,986 | 6/1985 | Liljequist ....................... 248/421 X |
| 4,802,374 | 2/1989 | Hamelin et al. . |
| 4,872,903 | 10/1989 | Periou . |
| 4,949,585 | 8/1990 | Dauvegne et al. . |
| 4,995,580 | 2/1991 | Fujii ................................ 248/421 |
| 5,014,958 | 5/1991 | Harney . |
| 5,123,622 | 6/1992 | Matsumoto et al. ............... 248/421 |
| 5,172,601 | 12/1992 | Siegrist et al. . |
| 5,220,906 | 6/1993 | Choma ........................... 74/89.15 X |
| 5,292,164 | 3/1994 | Rees . |
| 5,314,158 | 5/1994 | Mouri . |
| 5,317,769 | 6/1994 | Weismiller et al. .......... 74/89.15 X |
| 5,349,878 | 9/1994 | White et al. . |
| 5,456,439 | 10/1995 | Gauger . |
| 5,467,957 | 11/1995 | Gauger . |
| 5,473,958 | 12/1995 | Jeck et al. . |

*Primary Examiner*—Leslie A. Braun
*Assistant Examiner*—Derek J. Berger
*Attorney, Agent, or Firm*—Young & Basile, P.C.

[57] ABSTRACT

A vertical drive nut apparatus includes an elongated strap having an aperture formed in a central portion, and a pair of folded legs extending from the central portion and terminating in parallel first and second ends having coaxial apertures. A plastic drive nut is insert molded about the central portion of the strap with a threaded through bore in the drive nut coaxially aligned with the aperture in the central portion to threadingly receive a vertical drive lead screw. The first and second ends of the strap are pivotally connected to a bracket carried on a rotatable torsion tube extending between a pair of power seat adjuster track assemblies to effect rotation of the torsion tube and a resulting elevational change in one end of a seat upon translation of the drive nut and the strap by rotation of the vertical drive lead screw.

15 Claims, 2 Drawing Sheets

DRIVE NUT APPARATUS FOR VEHICLE SEAT ADJUSTER

BACKGROUND OF THE INVENTION

The present invention relates, in general, to vehicle power seat adjusters.

Power seat adjusters are a popular component in many automotive vehicles. Such power seat adjusters provide powered horizontal fore and aft adjustment of the vehicle seat. It is also known to provide vehicle power seat adjusters with a vertical or elevation drive mechanism to elevate and lower the seat height as a whole. Separate front and rear seat elevation mechanisms have also been provided to independently as well as simultaneously adjust the elevation of the front and rear edges of a vehicle seat. Power seat recliners have also been incorporated into a vehicle power seat adjuster.

Typically, a vehicle power seat adjuster includes an upper support frame or support members which engage and support the seat bottom of a vehicle seat. The upper support members are mounted on first and second, spaced track assemblies, each formed of an upper track which is connected to the upper support members and which is also slidably mounted in a lower track fixedly anchored to the vehicle floor.

A drive mechanism, typically formed of a bi-directional electric motor mounted between the first and second track assemblies, rotates a pair of drive shafts extending outward from the motor to a separate gear assembly or gear box mounted on each upper track. The gear box is connected to a threaded lead screw extending longitudinally between each upper and lower track pair. A drive block or nut is fixedly connected to one of the lower or upper tracks threadingly receives the lead screw to effect reciprocal movement of the upper track and the attached upper seat support member upon selective directional energization of the drive motor.

A similar drive motor, gear box, and threaded lead screw drive has also been utilized for vertical movement of the front and back ends of the upper support members as well as for pivotal movement of the seat back with respect to the seat bottom.

In such vertical drive mechanisms, the drive nut is typically in the form of a cylindrical, metal, tubular member having an internal threaded bore which receives the lead screw. Outwardly extending lugs are carried on one end of the tubular member and pivotally engage apertures or slots formed in a pair of brackets fixedly extending from a torsion tube or bar rotatably mounted between the front or rear ends of the track assemblies. In this manner, rotation of the lead screw causes linear translation of the drive nut which is converted by the drive nut and the mounting brackets into rotation of the torsion tube. Motion links attached to the torsion tube and the seat support member or frame effect vertical elevation or lowering of the front or rear end of the seat support member or frame.

Heretofore, such vertical drive nuts have been formed of metal which creates a metal to metal interface between the lead screw and the tubular metal drive nut. During operation, the threaded engagement between the threaded lead screw and the drive nut may create an objectionable rotational squeal. Plastic drive nuts which address this problem are known.

However, the mounting or formation of the lugs on the cylindrical drive nut as well as the precise mounting and configuration of the torsion tube bracket(s) results in a complicated assembly which requires close manufacturing tolerances for proper operation.

Thus, it would be desirable to provide a vertical drive apparatus for a vehicle power seat adjuster which overcomes certain of the problems encountered with previously devised vertical drive mechanisms. It would also be desirable to provide a vertical drive apparatus for a vehicle power seat adjuster which eliminates rotational squeal, is simple in construction, and easy to install in a power seat adjuster.

SUMMARY OF THE INVENTION

The present invention is a vertical drive nut apparatus for a vehicle power seat adjuster which overcomes certain of the problems encountered with previously devised vertical drive or drive nut apparatus for vehicle power seat adjusters.

The vertical drive nut apparatus includes a one-piece strap having a central portion and first and second opposed ends. An aperture is formed in the central portion of the strap. The first and second opposed ends of the strap are folded over into substantially parallel relationship and extend from the central portion. A drive nut having a threaded through bore adapted for threadingly receiving a lead screw therethrough is carried on the central portion of the strap, with the through bore in the drive nut coaxially aligned with the aperture in the central portion of the strap. Means are provided for mounting the first and second ends of the strap to a torsion tube on a seat adjuster to effect rotation of the torsion tube upon translation of the first and second ends of the strap due to rotation of the lead screw relative to the drive nut.

Preferably, the mounting means includes an aperture formed in each of the first and second ends of the strap, a bracket fixedly carried on the torsion tube, and pivot means extending through the apertures in the first and second ends of the straps and the bracket to pivotally connect the first and second ends of the strap to the bracket.

The drive nut is preferably formed of a moldable plastic material which is insert molded about the central portion of the strap.

An enlarged stop is mounted about one end of a vertical drive lead screw prior to threading engagement of the lead screw through the drive nut to act as an integral stop during translation of the drive nut along the lead screw.

The present invention also defines a method of constructing a vertical drive apparatus for a power seat adjuster. The method includes the steps of:

forming an elongated strap having a central portion with a central aperture and first and second ends extending oppositely from the central portion, Forming an aperture in each of the first and second ends of the strap, integrally mounting a plastic drive nut on the central portion of the strap, with a through bore in the drive nut coaxially aligned and communicating with the aperture in the central portion of the strap, forming threads in the bore in the drive nut, threading a vertical drive lead screw through the bore in the drive nut and the central aperture in the strap, folding the first and second ends of the strap into substantial parallel arrangement, and pivotally connecting the first and second ends of the strap to a bracket fixedly carried on a torsion tube.

Preferably, the method includes the step of insert molding the drive nut about the central portion of the strap. Further, a stop, preferably in the form of a washer or alternate means, is mounted about one end of the lead screw after threading engagement of the lead screw with the drive nut. The stop prevents the thread engaged portion of the lead screw from becoming unscrewed from the drive nut.

The present invention defines a unique vertical drive apparatus for a power seat adjuster which is simple in construction, easy to install in a power seat adjuster and eliminates rotational squeal caused by the metal to metal interface between the metal lead screw and the metal drive nut previously employed in power seat adjuster vertical drive assemblies. Further, installation of the vertical drive apparatus in a power seat adjuster is simplified since the connector or bracket between the ends of the strap forming the vertical drive apparatus of the present invention and the torsion tube may be in the form of an elongated, planar member thereby eliminating the more complex, double arm pivot brackets previously employed in vertical drive assemblies.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
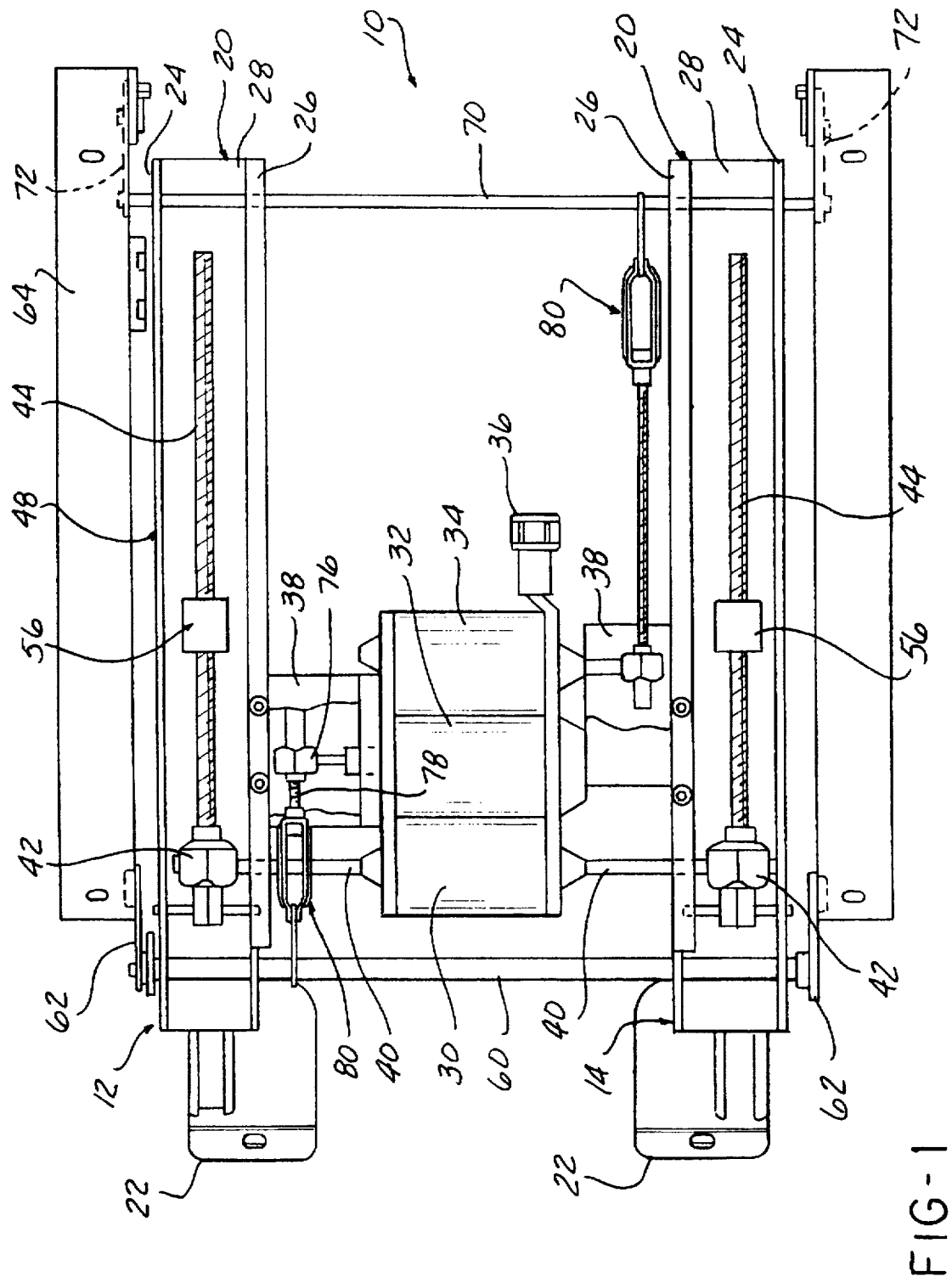
FIG. 1 is a plan, elevational view of an exemplary vehicle power seat adjuster utilizing a vertical drive nut apparatus of the present invention.

Referring now to the drawing, and to FIG. 1 in particular, there is depicted a power seat adjuster 10 which variably positions an automotive vehicle seat in any user selected position. The power seat adjuster 10 is a so-called "six-way" adjuster which provides horizontal fore and aft, and vertical up and down movement of separate front and rear ends of the seat. It will be understood, however, that the power seat adjuster described hereafter can also be constructed with pivotal tilting of the seat back with respect to the seat bottom of a vehicle seat.

As shown in FIG. 1, the power seat adjuster 10 includes two track assemblies 12 and 14 which are disposed in a spaced apart manner and anchored to the floor of a vehicle, as described hereafter. As the track assemblies 12 and 14 are identically functionally constructed as mirror images of each other, the following description will be provided only for track assembly 12. It will be understood that track assembly 14 is similarly constructed.

The track assembly 12 includes a lower track, not shown, and an upper track 20 which is slidably movable thereover. As is conventional, the lower track is formed with an upper portion slidably engaged with the upper track 20. A front riser 22 is connected by means of suitable fasteners, such as rivets, to a first end of the leg of the lower track. Similarly, a rear riser, not shown, is connected to a second or rear end of the leg by means of rivets. The front and rear risers are anchored by means of suitable fasteners or anchors to the vehicle floor in a conventional manner to stationarily mount the lower track to the vehicle floor.

The upper track 20 includes a pair of opposed side walls 24 and 26. A central base 28 is integrally formed with and extends between lower ends of the side walls 24 and 26. Lower webs, not shown, extend below the base 28 and inward from the juncture of the side walls 24 and 26 and the base 28 and terminate in a pair of spaced flanges 52 and 54 which form a channel therebetween which receives the upper portion of the lower track.

Both the lower track and the upper track 20 are formed, for example, of an extruded, lightweight, high strength material, such as aluminum or aluminum alloy. Tracks formed of other materials such as steel, magnesium, etc., could also be used.

The power seat adjuster 10 includes a first, horizontal drive means which is preferably in the form of a bi-directional electric drive motor 30. Also provided on the power seat adjuster 10 are a first or front vertical drive means or motor 32 and a second or rear vertical drive means or motor 34. An electrical connector 36 provides power and control signal connections to the motors 30, 32 and 34. The motors 30, 32 and 34 are arranged, by example, side-by-side and interconnected by end caps. The end caps are in turn securely connected to the opposed track assemblies 12 and 14 by means of mounting brackets 38. Individual packated motors could also be used in the present invention. Further details concerning the construction and operation of the drive motors 32 and 34 in controlling elevation of the seat may be had by referring to U.S. Pat. No. 5,292,164, the contents of which are incorporated herein by reference in its entirety.

The first or horizontal drive motor 30 has two drive shafts 40 extending outward from opposite ends to the track assemblies 12 and 14. Each drive shaft 40, which may be a rigid, tubular member or a flexible cable, rotatably passes through an aperture formed in one end of each of the upper tracks 20. The drive shaft 40 provided with the track assembly 12 is connected to a horizontal drive transmission means or gear box 42. The gear box 42 is securely connected to the upper track 20 of the track assembly 12 by means of a roll pin which extends between the side walls 24 and 26 of the upper track 20.

The horizontal drive transmission means or gear box 42 is of conventional construction and, by way of example only, includes a worm and worm gear disposed within an outer housing. The worm receives one end of the horizontal drive shaft 40 from the motor 30 and threadingly engages the worm gear which is formed about or mounted on one end of a horizontal drive lead screw 44. In this manner, the horizontal drive transmission means 42 serves to translate the rotation of the output shaft 40 of the horizontal drive motor 30 to rotation of the horizontal drive screw 44 which is oriented 90° with respect to the output shaft 40 of the drive motor 30. It will be understood that a similar drive transmission means 42 is also mounted in the opposed track assembly 14 and interconnected to the opposite output shaft 40 of the drive motor 30 and a second horizontal drive screw 44.

A horizontal drive block or nut 56 is fixed or rotatably coupled to the lower track. A threaded internal bore is formed in the drive nut block 56 and threadingly receives the horizontal lead screw 44 therethrough in a threading, meshing engagement.

In operation, energization of the horizontal drive motor 30 for rotation of the output shaft 40 in one direction will cause the drive transmission means or gear box 42 to rotate the drive screw 44 in one direction. Since the drive nut 56 is stationarily positioned relative to the lower track, rotation of the horizontal drive screws 44 in both of the track assemblies 12 and 14 will cause the upper tracks 20 of each of the track assemblies 12 and 14 to move horizontally in one direction depending upon the direction of rotation of the output shafts 42 of the horizontal drive motor 30. This enables the horizontal position of the upper tracks 20 of the track assemblies 12 and 14 to be adjusted by the user to any selectible horizontal fore or aft position. A reversal of the control signals to the horizontal drive motor 30 by way of a user activated switch will cause rotation of the output shafts 40 of the drive motor 30 in an opposite direction which will correspondingly result in rotation of the horizontal drive screws 44 in an opposite direction to cause movement of the upper tracks 20 of the track assemblies 12 and 14 in an opposite horizontal direction.

A front torsion tube or bar 60 is rotatably mounted at opposite ends to the upper tracks 20 of each of the track assemblies 12 and 14. A front motion control link 62 is pivotally connected to one end of the front torsion tube 60 and at another end to a seat support or frame member 64. A similar link 62 is mounted on the other end of the front torsion tube 60 as shown in FIG. 1.

A rear torsion tube 70 is rotatably connected between the rear ends of the upper tracks 20. At least one and possibly two or more rear motion control links 72 are mounted at opposite ends on the rear torsion tube 70 to control elevation of the rear end of the seat support members or frames 64 in a conventional manner.

The vertical drive assembly for the front end of the seat includes the vertical drive motor 32, a vertical drive gear box 76 and a vertical lead or drive screw 78. A unique vertical drive nut apparatus 80 constructed in accordance with the teachings of the present invention interconnects the front vertical drive lead screw 78 and the front torsion tube 60 to convert rotation of the vertical drive lead screw 78 to linear translation of the drive nut assembly 80 and to rotation of the front torsion tube 60 to control elevation of the front end of the seat support member 64.

Figure 2:
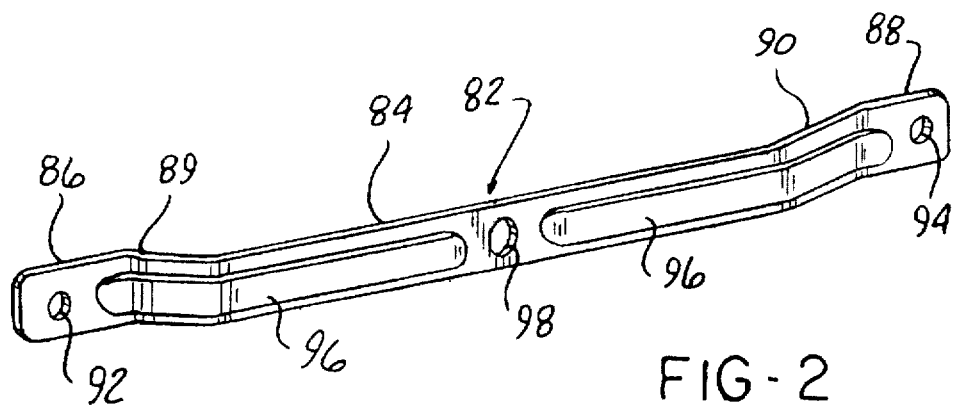
FIG. 2 is a perspective view of the strap employed in the vertical drive apparatus of the present invention.
Figure 3:
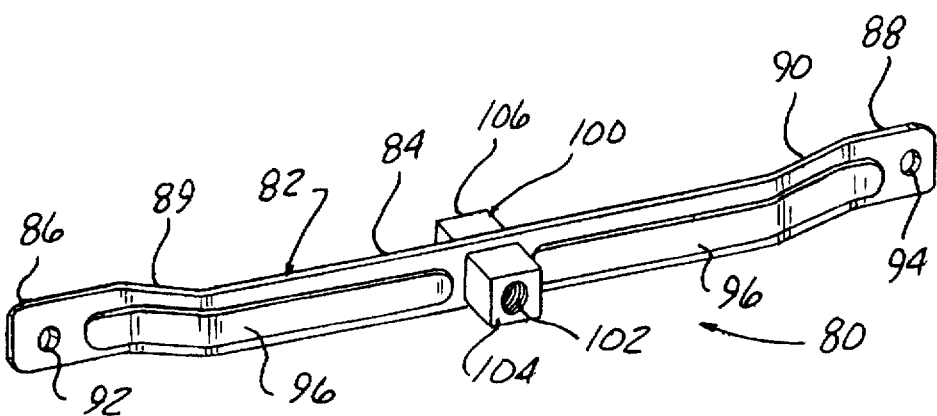
FIG. 3 is a perspective, partially constructed, assembled view of the vertical drive apparatus of the present invention.
Figure 4:
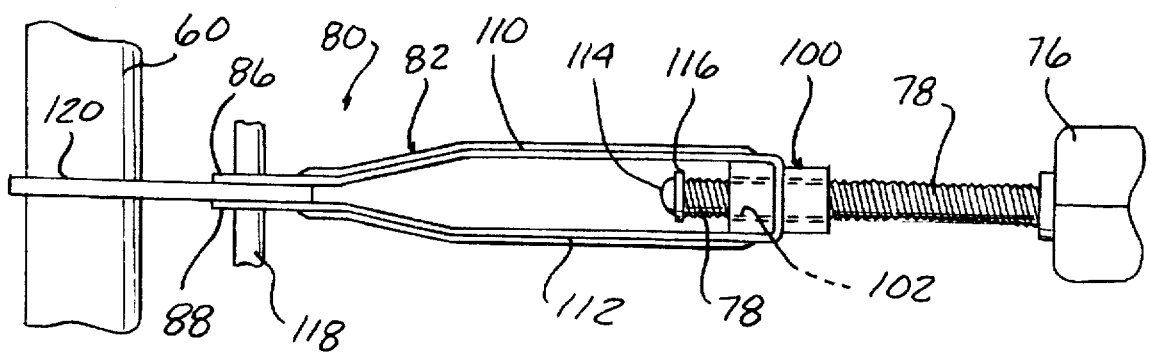
FIG. 4 is a plan elevational view of a complete vertical drive nut apparatus attached to a torsion tube.

As shown in FIGS. 2–4, the vertical drive nut apparatus 80 includes an elongated strap 82 preferably formed of a suitable metal, such as steel. The strap 82 is formed with a generally linear central portion 84 and first and second ends 86 and 88 which are offset from the central portion 84 by angled portions 89 and 90, respectively; but are generally parallel to the central portion 84. Apertures 92 and 94 are respectively formed in the first and second ends 86 and 88 of the strap 82. An aperture 98 is centrally formed in the central portion 84 of the strap 82.

Preferably, a raised portion 96 extends outward from one side of the strap 82 and extends between opposite ends of the central portion 84 and the first and second ends 86 and 88.

A block 100 preferably formed of plastic, such as glass-filled nylon 66, is mounted, such as by insert-molding, about the central portion 84 of the strap 82. The block 100 may have any exterior shape, such as cubical, cylindrical, etc., with a cubical form shown in FIG. 3 by way of example only. An internal threaded bore 102 extends through the block 100 from a first end 104 to a second 106 and is coaxially aligned and disposed in communication with the central aperture 98 in the strap 82.

After the block 100 has been mounted about the central portion 84 of the strap 82, the end portions of the strap 82 extending oppositely and laterally outward from the central portion 84 are folded over into a substantially parallel arrangement as shown in FIG. 4. This forms first and second parallel legs 110 and 112 which extend from the block 100 to the first and second ends 86 and 88, respectively. The first and second ends 86 and 88 are also disposed in parallel after the folding operation with the apertures 92 and 94 coaxially aligned as shown in FIG. 4.

Next, the vertical drive or lead screw 78 is threadingly inserted through the bore 102 in the block 100 and the central aperture 98 in the strap 82 and out of end 104 of the block 100. A stop means in the form of an enlarged washer 116 is inserted over end 114 of the lead screw 78 and is spun down or otherwise affixed adjacent to the head or end 114. The washer 116 acts as an integral stop when it engages the first end 104 of the block 100 during rotation of the lead screw 78 and translation of the vertical drive nut assembly 80 as described hereafter.

A connector 118 is inserted through the apertures 92 and 94 in the first and second ends 86 and 88 of the strap 82 to couple the strap 82 to a generally planar bracket 120 which is fixedly connected, such as by welding, to the front torsion tube 60 and extends angularly from the front torsion tube 60.

In operation, the vertical drive motor 34 will be energized for rotation of its output shaft in one direction. Rotation of the drive motor 32 output shaft, after connection through the vertical drive gear box 76, results in rotation of the vertical drive screw 78 in one rotation direction. As one end of the vertical drive screw 78 is axially stationarily positioned by the gear box 42, rotation of the vertical drive screw 78 results in linear translation of the block 100 and the attached strap 82. Since the bracket 120 extends angularly from the front torsion tube 60, linear translation of the strap 82 causes rotation of the end of the bracket 120 connected to the first and second ends 86 and 88 of the strap 82 and corresponding rotation of the front torsion tube 60. Rotation of the front torsion tube 60 in one direction causes pivotal movement of the front motion links mounted thereon thereby resulting in a change of the elevation of the front end of the seat support member or frame 64. Rotation of the output shaft of the vertical drive motor 32 in an opposite direction results in the same sequence of operation, but only in the opposite direction to cause an opposite change in the elevation of the front end of the seat adjuster 10.

As shown in FIG. 1, the vertical drive assembly 80 described above, can also be used on the rear vertical drive mechanism by interconnection with the rear vertical drive motor 34 and the rear torsion tube 70. Operation of the drive assembly 80 on the rear drive mechanism is the same as that described above for the front vertical drive mechanism.

In summary, there has been disclosed a unique vertical drive nut assembly for a vehicle power seat adjuster which minimizes the potential of rotational squeal as well as being of simple construction for ease of assembly and a low manufacturing cost.

What is claimed is:

1. A drive apparatus for a vehicle power seat adjuster having spaced track assemblies, at least one torsion tube extending between the track assemblies, a seat support mounting means coupled to the track assemblies and a seat for elevating the seat upon rotation of the torsion tube, and a drive motor rotatably coupled to a lead screw, the drive apparatus comprising:

a drive nut having a threaded through bore adapted for threadingly receiving a lead screw;

a one-piece strap having a central portion and first and second opposed ends;

an aperture formed in the central portion of the strap;

the first and second opposed ends of the strap folded over into substantially parallel relationship extending from the central portion;

the drive nut carried on the central portion of the strap, with the through bore in the drive nut coaxially aligned with the aperture in the central portion of the strap; and means adapted for mounting the strap to a torsion tube to effect rotation of the torsion tube upon translation of the strap resulting from rotation of the lead screw relative to the drive nut.

2. The drive apparatus of claim 1 wherein the mounting means comprises:

an aperture formed in each of the first and second ends of the strap;

a member adapted to be fixedly carried on the torsion tube;

pivot means, extending through the apertures in the first and second ends of the strap and the member, adapted for pivotally connecting the first and second ends of the strap to the member.

3. The drive apparatus of claim 2 wherein the drive nut is formed of a plastic material.

4. The drive apparatus of claim 1 wherein:

the drive nut is insert molded about the central portion of the strap.

5. The drive apparatus of claim 4 wherein:

the drive nut has first and second ends, the first and second ends extending outward from the central portion of the strap.

6. The drive apparatus of claim 1 wherein the drive nut is formed of a plastic material.

7. A method for constructing a vertical drive apparatus for a vehicle power seat adjuster having spaced track assemblies, at least one torsion tube rotatably extending between the track assemblies, a seat support mounting means coupled to the torsion tube and a seat for changing the elevation of the seat upon rotation of the torsion tube, a drive motor rotatably coupled to a vertical drive lead screw, the method comprising the steps of:

forming a plastic drive nut having a threaded through bore;

forming a carrier of an elongated strap having a central portion with a central aperture and first and second ends extending oppositely from the central portion, an aperture formed in each of the first and second ends of the strap;

integrally mounting the drive nut over the central portion of the strap, with a through bore in the drive nut coaxially aligned with and communicating with the central aperture in the strap;

threading a vertical drive lead screw through the bore in the drive nut; and pivotally connecting the carrier to a member fixedly carried on a torsion tube.

8. The method of claim 7 further comprising the step of: mounting a stop on one end of the lead screw.

9. The method of claim 7 wherein the step of integrally mounting the drive nut comprises insert molding the drive nut to the carrier.

10. The method of claim 7 further comprising the step of:

angularly offsetting the first and second ends of the strap from adjacent portions of the strap extending between the first and second ends and the central aperture in the strap.

11. A drive apparatus for a vehicle power seat adjuster having spaced track assemblies, at least one torsion tube extending between the track assemblies, a seat support mounting means coupled to the track assemblies and a seat for elevating the seat upon rotation of the torsion tube, and a drive motor rotatably coupled to a lead screw, the drive apparatus comprising:

a drive nut having a threaded through bore adapted for threadingly receiving a lead screw;

a strap having a central portion and first and second opposed ends;

an aperture formed in the central portion of the strap;

the first and second opposed ends of the strap extending from the central portion;

the drive nut carried on the central portion of the strap, with the through bore in the drive nut coaxially aligned with the aperture in the central portion of the strap; and means adapted for mounting the carrying means to a torsion tube to effect rotation of the torsion tube upon translation of the carrying means resulting from rotation of the lead screw relative to the drive nut.

12. A power seat adjuster having spaced track assemblies, at least one torsion tube extending between the track assemblies and a seat support mounting means coupled to the track assemblies and a seat for elevating the seat upon rotation of the torsion tube, the power seat adjuster comprising:

a rotatable lead screw;

a drive nut having a threaded through bore threadingly receiving the lead screw;

a strap having a central portion and first and second opposed ends;

an aperture formed in the central portion of the strap;

the first and second opposed ends of the strap extending from the central portion;

the drive nut carried on the central portion of the strap, with the through bore in the drive nut coaxially aligned with the aperture in the central portion of the strap; and means for mounting the strap to the torsion tube to effect rotation of the torsion tube upon translation of the strap resulting from rotation of the lead screw relative to the drive nut.

13. The power seat adjuster of claim 12 wherein the mounting means comprises:

an aperture formed in each of the first and second ends of the strap;

a member fixedly carried on the torsion tube; and pivot means, extending through the apertures in the first and second ends of the strap and the member, for pivotally connecting the first and second ends of the strap to the member.

14. The power seat adjuster of claim 12 wherein the drive nut is formed of a plastic material.

15. The power seat adjuster of claim 12 wherein the drive nut is insert molded about the central portion of the strap.

* * * * *

UNITED STATES PATENT AND TRADEMARK OFFICE
CERTIFICATE OF CORRECTION

PATENT NO. : 5,797,574
DATED : August 25, 1998
INVENTOR(S) : Brooks et al

It is certified that error appears in the above-indentified patent and that said Letters Patent is hereby corrected as shown below:

Column 8, line 20, delete "carrying means" and insert --strap--.

Column 8, line22, delete "carrying means" and insert --strap--.

Signed and Sealed this

Eleventh Day of May, 1999

Attest:

Attesting Officer

Q. TODD DICKINSON

Acting Commissioner of Patents and Trademarks